United States Patent
Mueller

(10) Patent No.: US 6,760,995 B2
(45) Date of Patent: Jul. 13, 2004

(54) ELECTRONIC FISHING DEVICE STEERABLE IN AZIMUTH AND DEPTH BY REMOTE CONTROL OR PREPROGRAMMED INSTRUCTIONS

(76) Inventor: Jack Clare Mueller, 2216 Lorraine Dr., Carrollton, TX (US) 75006

( * ) Notice: Subject to any disclaimer, the term of this patent is extended or adjusted under 35 U.S.C. 154(b) by 0 days.

(21) Appl. No.: 10/134,809

(22) Filed: Apr. 29, 2002

(65) Prior Publication Data

US 2003/0056424 A1 Mar. 27, 2003

Related U.S. Application Data

(60) Provisional application No. 60/325,087, filed on Sep. 25, 2001.

(51) Int. Cl.⁷ .............................................. A01K 85/00
(52) U.S. Cl. .............................. 43/26.2; 43/4; 43/43.13
(58) Field of Search ........................ 43/1, 4, 4.5, 17.1, 43/26.1, 26.2, 27.4, 42, 42.22, 43.13, 43.14, 17.6; 446/153, 154, 155, 156, 158, 161, 162, 163, 164

(56) References Cited

U.S. PATENT DOCUMENTS

| | | | | |
|---|---|---|---|---|
| 3,203,131 A | * | 8/1965 | Myers | 43/26.1 |
| 3,613,284 A | * | 10/1971 | Anderson | 43/26.1 |
| 3,808,731 A | * | 5/1974 | Lowrance | 43/4 |
| 3,973,350 A | | 8/1976 | England | 43/42.03 |
| 3,978,811 A | | 9/1976 | Angus et al. | 114/245 |
| 4,028,839 A | | 6/1977 | Stubblefield | 43/43.13 |
| 4,161,077 A | | 7/1979 | Ciaccio et al. | 43/26.1 |
| 4,713,967 A | * | 12/1987 | Overs et al. | 73/170.33 |
| 4,757,633 A | * | 7/1988 | Van Cleve | 43/26.1 |
| 4,793,088 A | | 12/1988 | Fortuna | 43/27.4 |
| 4,856,222 A | | 8/1989 | Hannam | 43/26.1 |
| 5,058,309 A | | 10/1991 | Firmin | 43/42.13 |
| 5,077,929 A | * | 1/1992 | Khan | 43/26.1 |
| 5,154,016 A | * | 10/1992 | Fedora et al. | 43/26.1 |
| 5,177,891 A | * | 1/1993 | Holt | 43/17.1 |
| 5,201,884 A | * | 4/1993 | Nicholas | 43/26.1 |
| 5,293,712 A | * | 3/1994 | Lo | 43/26.1 |
| 5,363,587 A | * | 11/1994 | Nordling | 43/26.1 |
| 5,495,689 A | * | 3/1996 | Cassem | 43/17.1 |
| 5,511,335 A | | 4/1996 | Langer | 43/4 |
| 5,782,033 A | * | 7/1998 | Park et al. | 43/4 |
| 5,806,232 A | | 9/1998 | James | 43/26.1 |
| 5,867,932 A | | 2/1999 | Reiger | 43/43.13 |
| 5,934,007 A | | 8/1999 | Ellestad | 43/42.06 |
| 6,047,492 A | | 4/2000 | Watson et al. | 43/42.31 |
| 6,108,962 A | | 8/2000 | Barron | 43/42.31 |
| 6,122,852 A | * | 9/2000 | Mechling, IV | 43/4 |
| 6,122,854 A | | 9/2000 | Kinnear | 43/42.02 |
| 6,170,191 B1 | | 1/2001 | Laney | 43/43.13 |
| 6,179,683 B1 | * | 1/2001 | Pell et al. | 446/154 |
| 6,269,763 B1 | * | 8/2001 | Woodland | 114/382 |
| 6,304,512 B1 | | 10/2001 | Boys | 367/2 |
| 6,308,581 B1 | * | 10/2001 | Deeds | 73/861.52 |
| 6,389,732 B1 | * | 5/2002 | Daniel | 43/4.5 |

FOREIGN PATENT DOCUMENTS

| | | | |
|---|---|---|---|
| GB | 2200823 | * | 8/1988 |
| JP | 5-95750 | * | 4/1993 |
| WO | WO 02.056671 | | 1/2002 |

* cited by examiner

Primary Examiner—Peter M. Poon
Assistant Examiner—David Parsley
(74) Attorney, Agent, or Firm—Michael L. Diaz

(57) ABSTRACT

An electronic fishing device and control system. The fishing device includes an electro-mechanically actuated dive plane and rudder for steering the device in azimuth and depth by remote control or by preprogrammed instructions. In an autonomous mode, a device memory is preprogrammed with control instructions, and the device executes the instructions when placed in the water. In a remote control mode, the device is controlled by a remote control box located on a boat or shore. Preprogrammed instructions or user inputs may be utilized to steer the device. The control box may be interfaced with a fish finder to automatically generate commands to steer the device to fish detected by the fish finder.

4 Claims, 8 Drawing Sheets

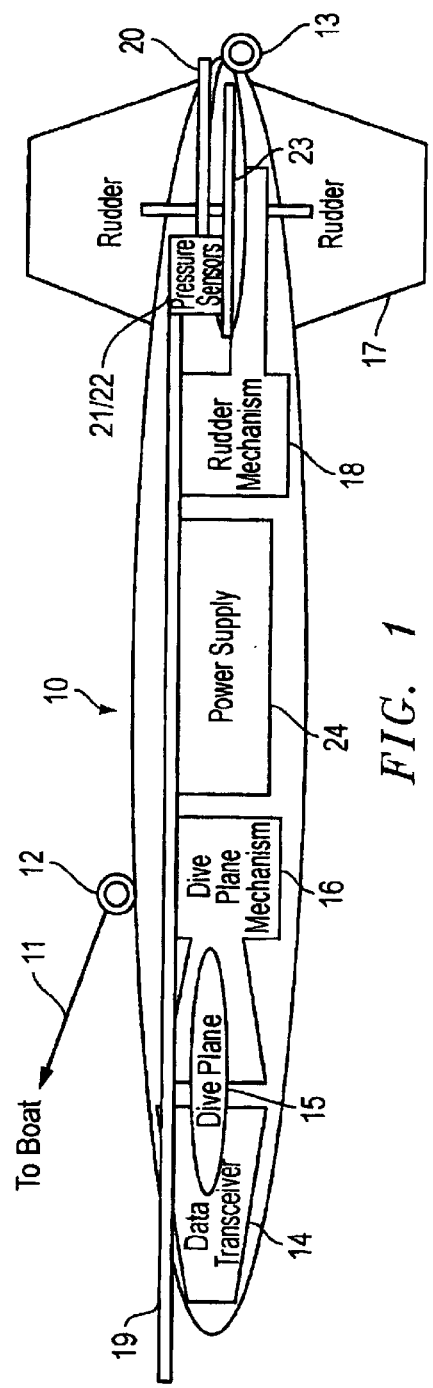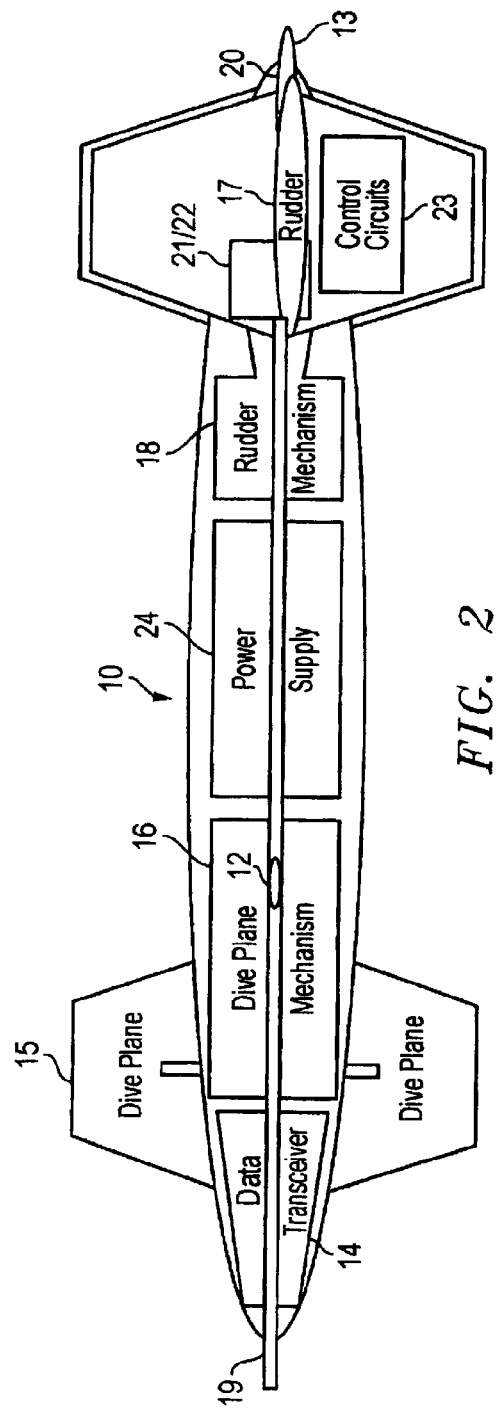

ELECTRONIC FISHING DEVICE STEERABLE IN AZIMUTH AND DEPTH BY REMOTE CONTROL OR PREPROGRAMMED INSTRUCTIONS

PRIORITY STATEMENT UNDER 35 U.S.C. § 119(e) AND 37 C.F.R. § 1.78

This nonprovisional application claims priority based upon the prior U.S. provisional patent application entitled, "Fishing Device with Depth and Azimuth Remotely Controlled," application No. 60/325,087, filed Sep. 25, 2001 in the name of Jack Clare Mueller.

BACKGROUND OF THE INVENTION

1. Technical Field of the Invention

This invention relates to fishing equipment. More particularly, and not by way of limitation, the present invention is directed to an electronic fishing device that can be steered in azimuth and depth by remote control or by preprogrammed instructions.

2. Description of Related Art

In general, methods of fishing can be divided into two broad categories: (1) fishing with a lure or baited hook, and (2) fishing with a net or trap. Sport fishermen generally use a fishing method in the first category, and may fish from the shore of a lake or river, or may fish from a boat. While boat fishing, the boat may be stationary, or the boat may move while the lure or bait is trolled behind the boat. Common problems experienced by sport fishermen arise from the fact that the fishermen have limited control over the positioning of the lure in the water. For depth control, a float may be positioned on the fishing line at a distance from the lure equal to the desired depth. However, this method is not accurate when the lure is moving through the water. Some lures may have control surfaces that cause the lure to dive when it is pulled through the water. Therefore, the depth of the lure may be roughly determined by the speed of the lure. However, this technique is also not very accurate. Azimuth control is generally determined by the direction in which the fisherman casts the lure. Once it is in the water, however, the lure is limited to traveling a direct line between the lure and the fisherman as it is reeled in.

Commercial fishermen may use hook lines or may use a method in the second category (i.e., fishing with a net/trap). Outriggers and/or downriggers may be utilized to deploy the hook lines. Outriggers and downriggers utilize an underwater foil connected to the lines, and the speed generated by the trawler causes the foil to pull the hook lines outward from the side of the trawler, or to pull the lines to a desired depth, respectively. The use of outriggers and downriggers requires that the trawler maintain sufficient headway to provide the necessary force on the foils to properly deploy the lines. In an alternative method, the trawler may let out a length of net behind the trawler using electric wenches, and the trawler may then steam in a circle to enclose a school of fish with the net. This method of deploying a net also requires that the trawler maintain sufficient headway to avoid tangling the net.

In order to overcome the disadvantage of existing solutions, it would be advantageous to have an electronic fishing device that can be steered in azimuth and depth by remote control or by preprogrammed instructions. The present invention provides such a device.

SUMMARY OF THE INVENTION

The present invention is a fishing device that goes where the fish are. The device is a remote controllable or autonomous aquatic harvesting and control device. In different embodiments, the device may detect, pursue, and then hook, net, or trap the fish. In different embodiments, the device comes in different sizes, and with different capabilities and intelligence depending on the user's application.

In one aspect, the present invention is directed to a fishing device that includes means for catching fish, and means for controlling the device's depth and azimuth heading. The means for controlling the device's depth and azimuth heading may include a plurality of control surfaces extending from the device into a surrounding body of water, and electro-mechanical control means for moving the control surfaces. Depth control may be performed through a combination of device buoyancy and movement of the control surfaces. The fishing device may be steered in azimuth and depth by remote control or by preprogrammed instructions.

In another aspect, the present invention is directed to a system for electronically controlling a fishing device in a body of water. The system comprises a fishing device that includes means responsive to control instructions for controlling the device's depth and azimuth heading, and a remote controller that generates the control instructions. A communications link between the fishing device and the remote controller carries the control instructions from the remote controller to the fishing device. The communications link may be a sonic data link that utilizes sound waves in the water to transmit the control instructions to the fishing device, an electromagnetic data link that utilizes electromagnetic waves through the water to transmit the control instructions to the fishing device, or a wireline data link that utilizes a data connection through a tether to transmit the control instructions to the fishing device.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 1 is a cut away side elevation view of a towed embodiment of the fishing device of the present invention;

FIG. 2 is a cut away top plan view of the towed embodiment of the fishing device as shown in FIG. 1;

DETAILED DESCRIPTION OF EMBODIMENTS

Figure 3:
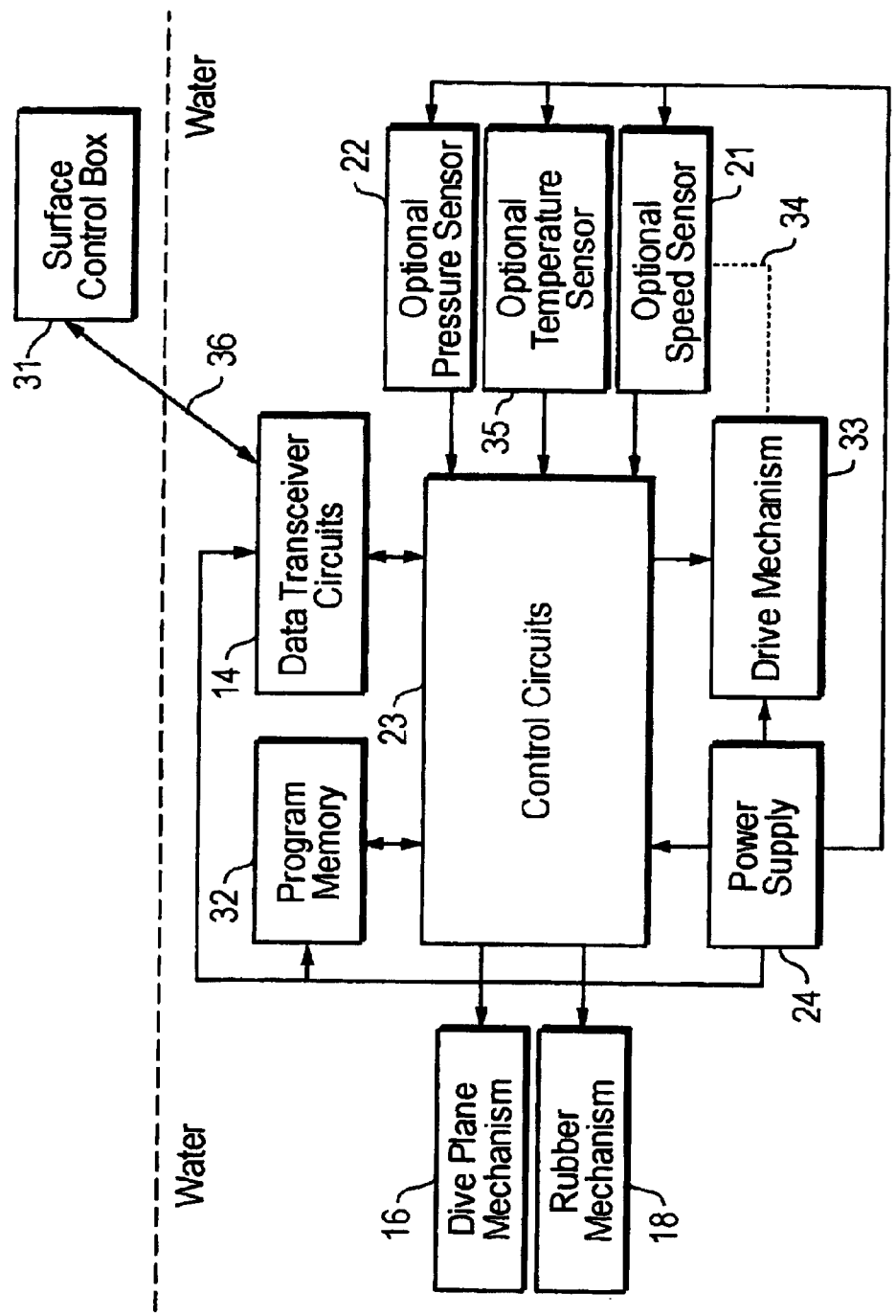
FIG. 3 is a simplified functional block diagram of a self-propelled embodiment of the fishing device of the present invention.

The present invention is an electronic fishing device that can be steered in azimuth and depth by remote control or by preprogrammed instructions. The device may be towed by a boat or trawler, or may be self-propelled. The device may be a lure with hooks attached, or it may tow a separate fish-catching device such as a net. The device provides the fisherman with real-time electronic control of the depth and direction of travel of the device through the use of dive planes and steering planes that are, in the preferred embodiment, electronically controlled and mechanically actuated. Device buoyancy may also be utilized for depth control, either alone or in combination with the dive planes. Preferably, the device has slightly positive buoyancy (for example, the device may be constructed from a material having positive buoyancy), and the dive planes are utilized to counter this buoyancy when the device is moving through the water. In this way, the device floats to the surface if the device loses headway or breaks loose from its tether.

For commercial fishermen, the device may be attached to a net or trap, and may be remotely controlled to encircle a school of fish, or may be programmed to steer a predefined path to deploy the net. Alternatively, the invention may be mounted at the end of an outrigger or downrigger line, replacing the foil, to provide greater maneuverability and control, especially when the trawler is moving very slowly or is stationary.

The device may be operated in two different modes: remote control or autonomous. When remotely controlled, the device may be operated manually through a remote-control apparatus or may be automatically controlled by a preprogrammed control box on a boat or on shore. Communications with the deployed device may be by any suitable communications link including a wireline connection via a tether to the device, by sonic signals through the water using, for example, DTMF tones, or by electromagnetic signaling. When autonomous, the device is preprogrammed to operate according to specifically identified parameters. In either mode of operation, the device may be towed behind a boat, or it may move under its own propulsion.

FIG. 1 is a cut away side elevation view of a towed embodiment of the fishing device 10 of the present invention, and FIG. 2 is a cut away top plan view of the fishing device. The device may be towed by a boat with a tether 11 attached to an eye-hook 12. A second eye-hook 13 may be used to attach other fishing equipment or an additional line with a baited hook at the end. The tether may include an electrical wire or cable for communicating between a data transceiver 14 in the fishing device and the surface control box. A dive plane 15 is operated by a dive plane mechanism 16 to control the depth of the device. Likewise, a rudder 17 is operated by a rudder mechanism 18 to control the heading (i.e., azimuth position) of the device. A bow-mounted Pitot tube 19 and a stern-mounted Pitot tube 20 supply water pressure readings to two pressure sensors 21 and 22. Control circuits 23 may comprise analog circuits or a digital microprocessor for controlling the various components in the device. Finally, a power supply 24 such as a rechargeable battery supplies electrical power to all components of the device.

FIG. 3 is a simplified functional block diagram of a self-propelled embodiment of the fishing device of the present invention. The power supply 24 is the source of power for all the components of the device 10, and is preferably rechargeable batteries. Power may be distributed to the components through a fused connection and voltage regulators as required (not shown). The control circuits 23 may be a microcontroller or analog circuits, discreet logic, or mechanical or other structures that make use of digital and/or analog input and output to perform the required tasks. The microprocessor is preferred due to its low cost and reprogrammability. The control circuits may include a timer, several I/O functions, and the like as required to simultaneously detect, measure, and control several signal sources and destinations. Instructions and data transmitted to the device from the surface control box 31 are received in the data transceiver circuit 14 which passes them to the control circuits 23. When the device is operating in the autonomous mode, a program memory 32 provides the application instructions to the control circuits.

The dive plane mechanism 16 and rudder mechanism 18 are broadly defined as servomechanisms that are utilized to control the device's depth and azimuth heading, respectively. Many types of actuators for the control surfaces may be utilized, for example, solenoids, nano-muscles, memory wire, or preferably servos. Several environmental sensors are also depicted. The optional pressure sensor 22 is connected to the stern-mounted Pitot tube 20. The optional pressure sensor 21 is connected to the bow-mounted Pitot tube 19. The device's speed may then be determined by measuring the pressure from both the stern-mounted Pitot tube 20 and the bow-mounted Pitot tube 19, and determining the speed from the difference between the two pressure readings. In another embodiment, the device's speed may be determined by reading the RPMs from a drive mechanism 33 (as shown by dotted line 34) or from a small water wheel with a magnetic pickup to determine RPMs. The drive mechanism may be a small DC electric motor with a propeller mounted on the drive shaft thereof. When the device is being towed, a speed indication may be passed from the surface control box 31 on the boat to the device.

The speed of the device through the water is used as an input to the dive plane mechanism 16 and the rudder mechanism 18 to determine the amount of control surface deflection required to achieve a desired maneuver. At slower speeds, greater deflections are required to achieve the same results.

The device may also include an optional temperature sensor 35. Fish are known to seek out water of a particular temperature. The device may be programmed to descend until the water temperature equals a predefined temperature. The device may then climb and descend as necessary to follow a path that maintains a constant temperature. The device communicates with the surface control box 31 via a communications link 36. As noted above, this link may be hard wired via the tether 11, or may utilize sonic, electromagnetic, or other suitable communications technologies.

Figure 4:
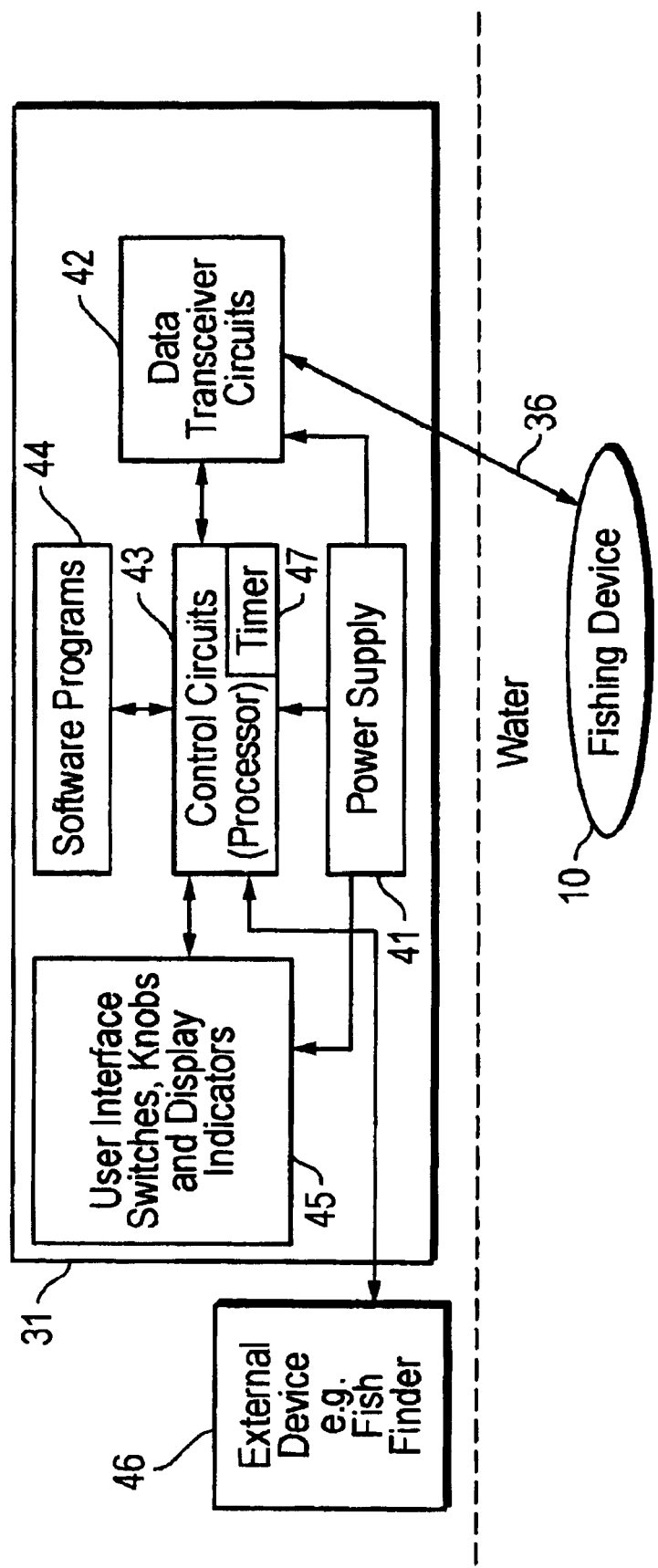
FIG. 4 is a simplified functional block diagram of a surface control box utilized for remote control of the fishing device of the present invention.

FIG. 4 is a simplified functional block diagram of the surface control box 31 utilized for remote control of the fishing device 10 of the present invention. A power supply 41 supplies electrical power to all of the components of the control box. Data transceiver circuits 42 communicate via the communications link 36 with the fishing device. A processor 43 controls the operation of the surface control box and accesses a software program memory 44 for application programs. The processor may be implemented as a microprocessor and associated supporting circuitry such as system update timer 47. A user interface module 45 may include input devices such as switches, knobs, a keypad, a keyboard, a mouse, and/or a joy stick, and output devices such as lights, displays, audio indicators, or other user interface devices. The user may enter data required for initial setup of the device, or may enter control inputs during remote control operation of the device. The control box may be implemented as a personal computer, hand-held computer, custom embedded controller, and the like.

The processor 43 may also interface with external devices 46 such as radar, visual sources, or other fish-detecting devices such as a sonar fish finder. The processor receives inputs from the fish finder regarding the depth and direction of detected fish. The processor then passes control instructions to the fishing device to steer the device toward the fish. In one embodiment, the control box is integrated with the fish finder. Some fishing boats may have the equivalent of a LAN on board, tying together data from various sensors such as radar and sonar. All such data can be utilized to provide steering instructions to the fishing device.

Figure 5:
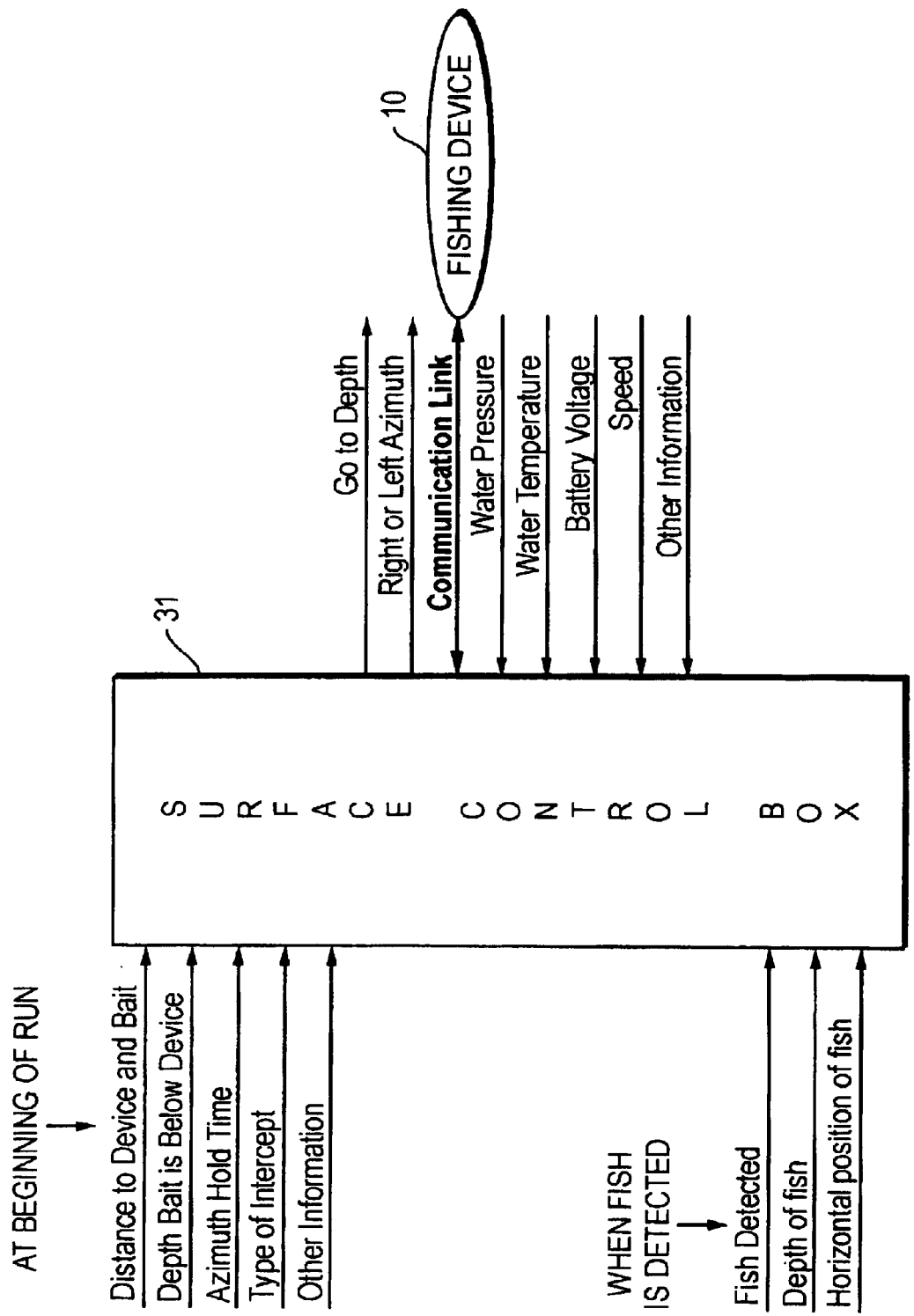
FIG. 5 is a signal flow diagram showing the flow of information between the surface control box and the fishing device, and between the surface control box and external information sources in one embodiment of the present invention.

FIG. 5 is a signal flow diagram showing the flow of information between the surface control box 31 and the fishing device 10, and between the surface control box and external information sources 46 in one embodiment of the present invention. The control box can operate in three basic modes: setup mode, monitor mode, and controller mode. In the setup mode, the user programs the fishing device to follow a desired pattern once it is in the water and has reached a predefined depth. For example, the user may program the device to swim a pattern mimicking a particular type of bait. He "plugs" the device into the control box and programs the flash program memory 32 in the device. The user may enter data such as the distance to the device and bait, the speed the device is being towed, the depth of the bait below the device, the type of intercept desired, an azimuth hold time, and other information as required. The control box generates setup commands for the fishing device, sends the setup commands to the fishing device, and updates the user display. The fishing device is then disconnected from the control box, and the control circuits 23 in the fishing device use the program memory 32 to obtain maneuvering instructions. The user can then cast the device like a normal lure. When the device senses that it has reached the predefined depth, it begins to execute the programmed actions.

In the monitor mode, the control box 31 receives telemetry over communications link 36 from the fishing device 10 and monitors the device's status. The status reports may include such information as water pressure, water temperature, battery voltage, speed, depth, location, and so on. The control box displays this information to the user, and may also display information received from external devices 46 such as the fish finder, GPS, and so on. This mode may be utilized when the fishing device is operating in the autonomous mode, controlling its own depth, heading, and attitude. In different embodiments, the device can detect, pursue and then hook, net, or trap the fish.

In the controller mode, the control box is remotely controlling the fishing device in real time, and in response to preprogrammed instructions, and/or to inputs received from the user or external devices 46. The control box reads the fishing device status, reads external inputs and user inputs, calculates a next position command, sends the command to the fishing device, and updates the user display. For example, in response to receiving a fish-detected indication and the depth and horizontal position of the fish, the control box may send instructions to the fishing device ordering it to go to a specified depth and to turn right or left to intercept the fish.

Figure 6A:
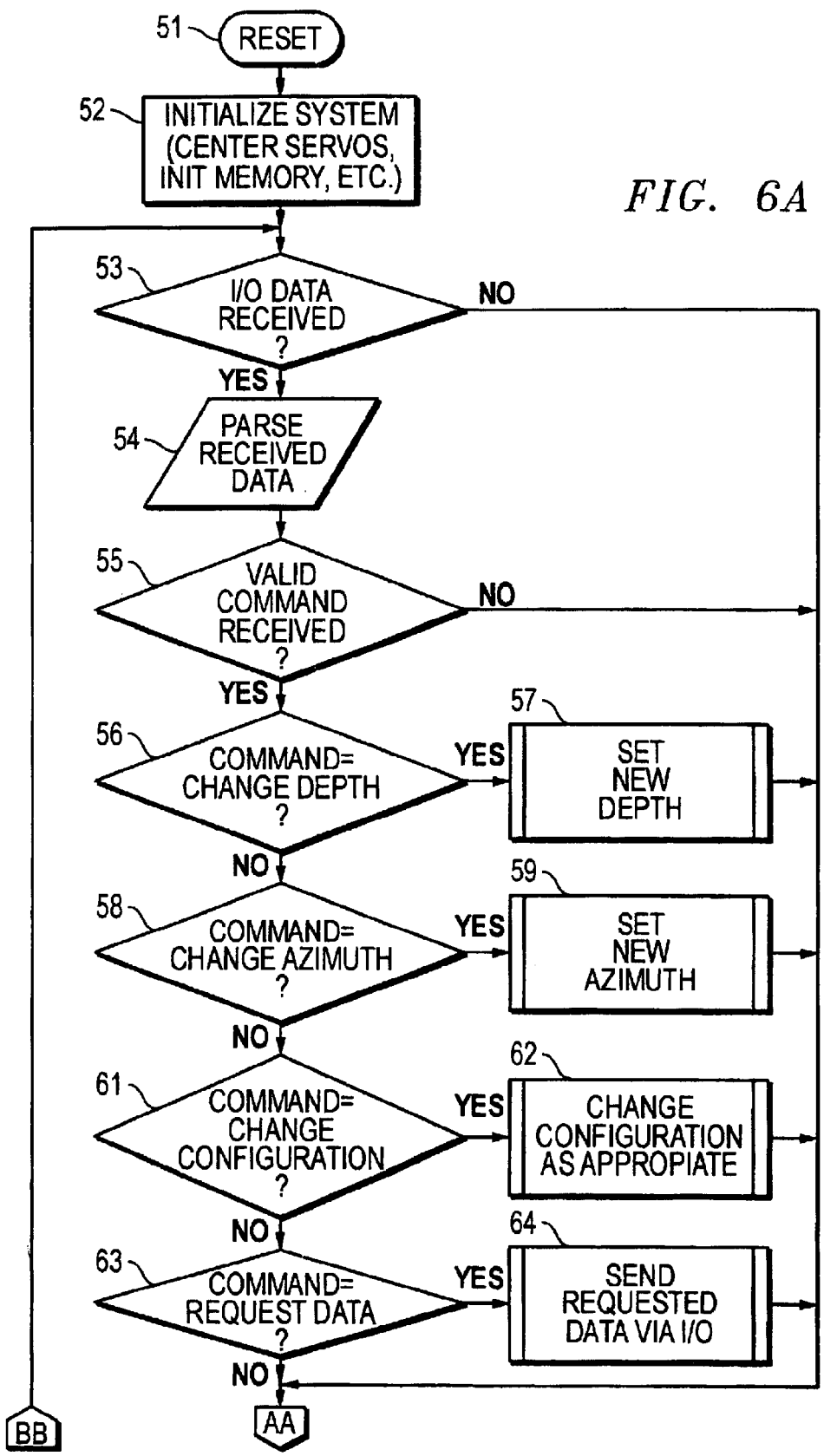
FIGS. 6A and 6B are portions of a flow chart illustrating the functions performed by the fishing device of the present invention in a plurality of fishing scenarios.
Figure 6B:
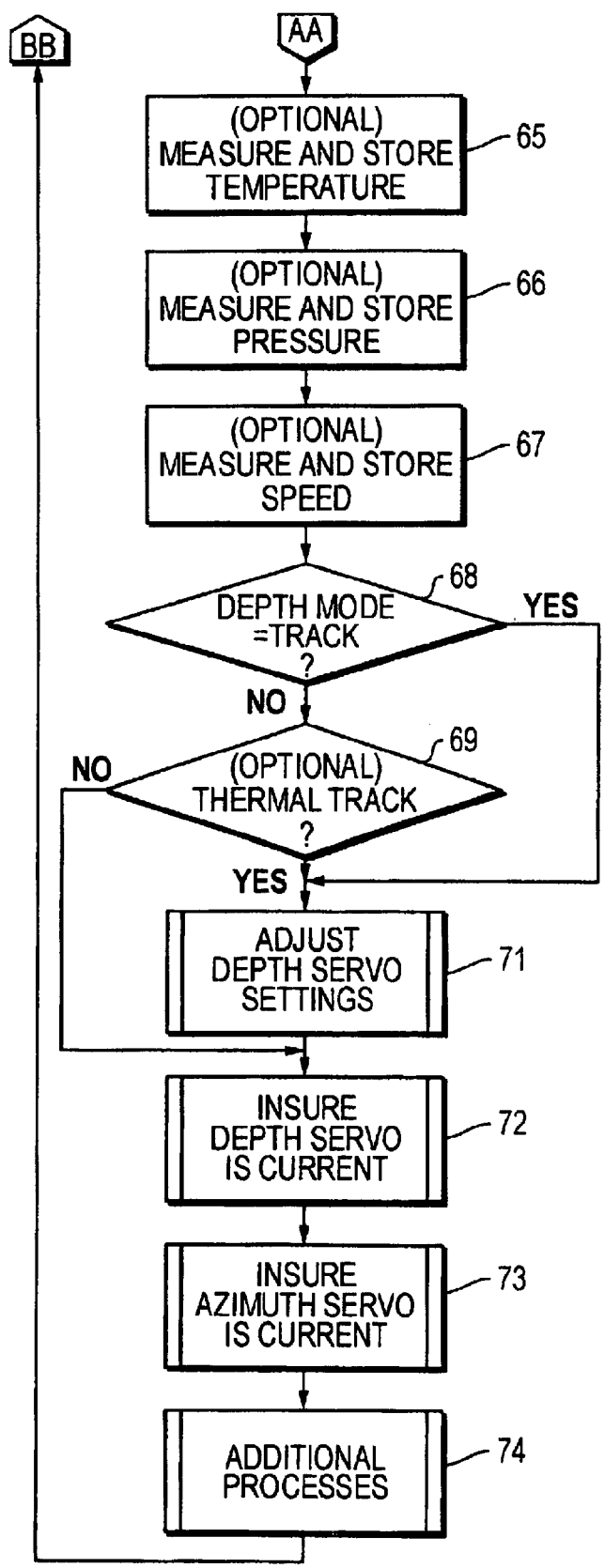

FIGS. 6A and 6B are portions of a flow chart illustrating the functions performed by the fishing device of the present invention in a plurality of fishing scenarios. At step 51 of FIG. 6A (Reset), the fishing device 10 is powered on. The process then moves to step 52 for system initialization. The control servos in the dive plane mechanism 16 and the rudder mechanism 18 are set to a known physical position, preferably centered. All memory, variables, and modes are set to factory defaults or values programmed into the flash memory 32. At step 53, the device is placed in the water, and the communications link 36 is tested to determine whether there is any incoming data from the control box 31. If not, the process moves ahead to step 65 of FIG. 6B.

However, if it is determined that there is incoming data from the control box, the process moves to step 54 where the received data is parsed. The received data is inspected, and if valid, the data is parsed into command and data segments. At step 55, it is determined whether a valid command was received. If not, the process moves ahead to step 65 of FIG. 6B. However, if a valid command was received, the process moves to step 56 where it is determined whether the received command is to change the device's depth. If so, a subroutine is called at 57, and a new depth is set. The process then moves ahead to step 65 of FIG. 6B. However, if the received command is not to change the device's depth, the process moves from step 56 to step 58 where it is determined whether the received command is to change the device's azimuth heading. If so, a subroutine is called at 59, and a new azimuth is set. The process then moves ahead to step 65 of FIG. 6B.

However, if the received command is not to change the device's azimuth, the process moves from step 58 to step 61 where it is determined whether the received command is to change the device's configuration. If so, a subroutine is called at 62, and a new configuration is established by, for example, changing variables stored in the program memory 32. This may include changing automatic or default settings such as "maintain depth" as well as fixed setting such as "maintain azimuth", or any combination of settings. The "change configuration" command provides a simple way to initialize the fishing device and program it to perform a predefined task. The process then moves ahead to step 65 of FIG. 6B. However, if the received command is not a change configuration command, the process moves from step 61 to step 63 where it is determined whether the received command is a request for data such as the device's status or environmental conditions. If not, the process moves ahead to step 65 of FIG. 6B. If the command is a request for data, a subroutine is called at 64, and the requested data is sent to the control box. The process then moves ahead to step 65 of FIG. 6B.

Referring now to FIG. 6B, step 65 is an optional step that may be performed if a water temperature feature is present and activated. The control circuits 23 in the fishing device 10 interrogate the optional temperature sensor 35 and may then store the measurement in memory for later use. Alternatively, the control circuits may adjust the course or depth of the fishing device to maintain a predefined temperature profile. If the optional temperature sensor is present, but the water temperature feature is not activated, the temperature measurements may be discarded. If the optional temperature sensor is not present, step 65 is skipped.

Step 66 is an optional step that may be performed if a water pressure feature is present and activated. The control circuits 23 in the fishing device 10 interrogate the optional pressure sensor 22 and may then store the measurement in memory for later use. Alternatively, the control circuits may adjust the depth of the fishing device to maintain a predefined water pressure profile. If the optional pressure sensor is present, but the water pressure feature is not activated, the water pressure measurements may be discarded. If the optional pressure sensor is not present, step 66 is skipped.

Step 67 is an optional step that may be performed if a speed feature is present and activated. The control circuits 23 in the fishing device 10 interrogate the optional speed sensor 21 and may then store the measurement in memory for later use. Alternatively, the control circuits may adjust the speed of the fishing device to maintain a predefined speed. In the preferred embodiment, the speed is determined from water pressure readings from the bow-mounted Pitot tube 19 and the stern-mounted Pitot tube 20. Therefore, water pressure measurements are obtained from both the optional speed sensor 21 and the optional pressure sensor 22. The speed may then be determined by the control circuits. If the optional speed sensor 21 is present, but the speed feature is not activated, the water pressure measurements from the speed sensor may be discarded. If the optional speed sensor is not present, step 67 is skipped.

The fishing device 10 of the present invention may be set to maintain a predefined depth based on water pressure, or to maintain a depth based on a predefined temperature profile. Thus, at step 68 it is determined whether or not the depth mode is set to depth tracking. If not, the process moves to step 69 where it is determined whether the depth mode is set to temperature tracking. If the depth mode is set to either depth tracking or temperature tracking, the process moves to step 71 where the control circuits 23 determine the change of depth necessary to achieve the desired depth or the desired water temperature. At step 72, the dive plane mechanism 16 is ordered to change the settings on the dive plane servos as required to adjust the depth of the fishing device. At step 73, the rudder mechanism 18 is ordered to change the settings on the rudder servos as required to adjust the azimuth heading of the fishing device. Additional features may be implemented at step 74 in similar fashion. The process then returns to step 53 of FIG. 6A and awaits further instructions or continues in autonomous mode.

Figure 7:
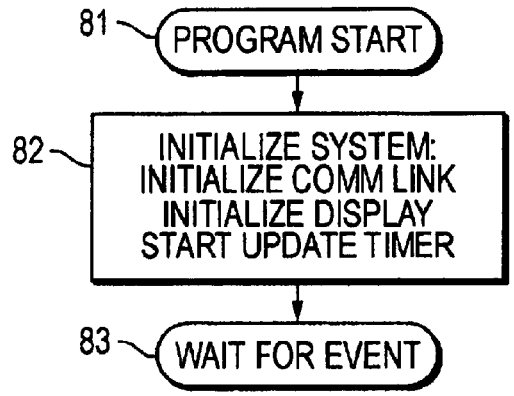
FIG. 7 is a flow chart illustrating the steps of an exemplary startup process performed by the control box in one embodiment of the present invention.

FIG. 7 is a flow chart illustrating the steps of an exemplary startup process performed by the control box in one embodiment of the present invention. The process starts at step 81, and at step 82, system initialization is performed, and program variables and parameters are initialized. This may include initializing the communications link 36, initializing any displays utilized in the user interface 45, and starting the update timer 47. The system update timer generates events at regular intervals triggering the system to update the fishing device's internal circuits and the control box status. At step 83, the process then waits for a triggering event to enter one of the control box modes of operation, and the processor is released to perform other tasks. Steps 81–83 are common to each mode of operation.

Figure 8:
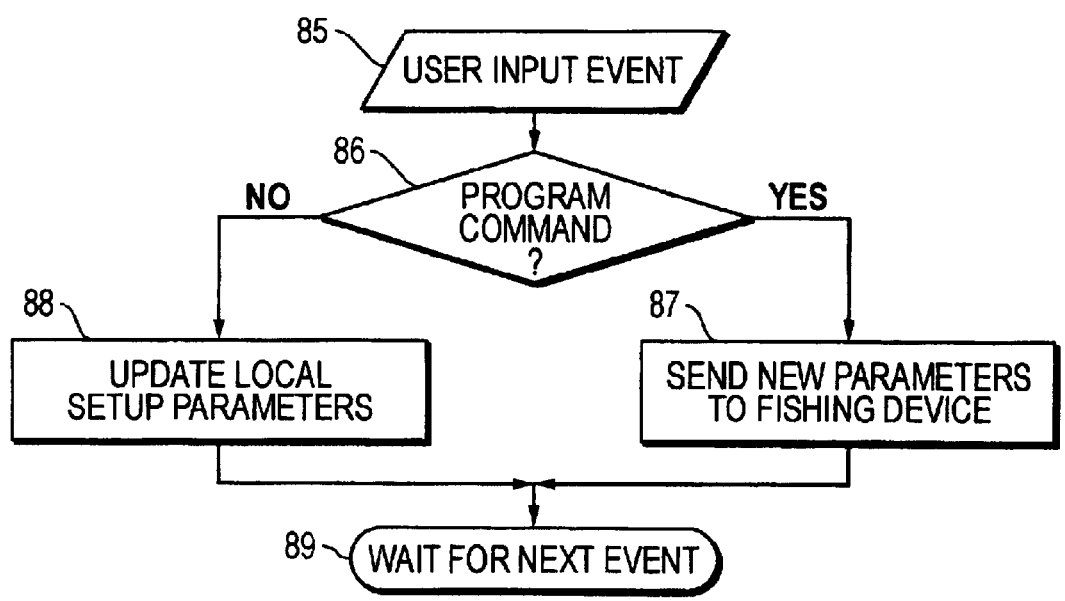
FIG. 8 is a flow chart illustrating the steps of an exemplary setup mode process performed by the control box in one embodiment of the present invention.

FIG. 8 is a flow chart illustrating the steps of an exemplary setup mode process performed by the control box in one embodiment of the present invention. At step 85, the control box detects an event triggered by a user input. At step 86, it is determined whether the event is a request to program current settings into the fishing device 10. If so, the process moves to step 87 where preprogrammed parameters are sent to the fishing device. If the event is not a request to program current settings into the fishing device, but is a new parameter, the process moves to step 88 and updates the local setup parameters. The process then moves to step 89, releases the processor 43, and waits for the next triggering event.

Figure 9:
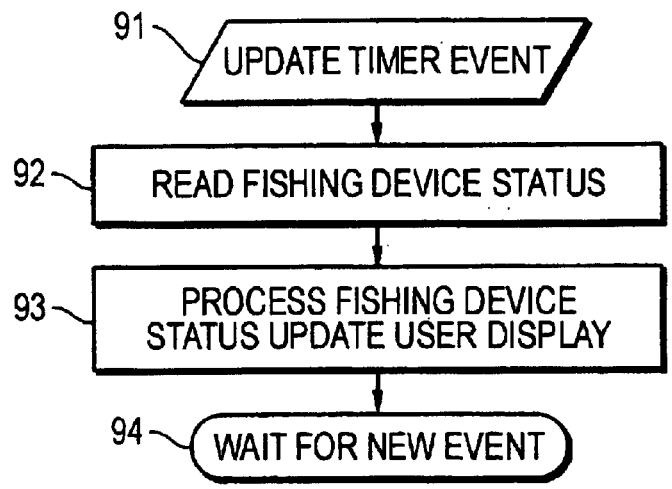
FIG. 9 is a flow chart illustrating the steps of an exemplary monitor mode process performed by the control box in one embodiment of the present invention.

FIG. 9 is a flow chart illustrating the steps of an exemplary monitor mode process performed by the control box in one embodiment of the present invention. The system update timer 47 generates an event which is detected at step 91. At step 92, the control box 31 then uses the communications link 36 to read the status of the fishing device 10. The status information may include raw pressure measurements and optional temperature measurements taken by the device's pressure sensors 21 and 22 and the temperature sensor 35. At step 93, the status information is processed, and the user display is updated. This may include processing the raw pressure and temperature data to determine the device's depth, speed, and position relative to thermal inclines or inversions in the water. The process then moves to step 94, releases the processor 43, and waits for the next triggering event.

Figure 10:
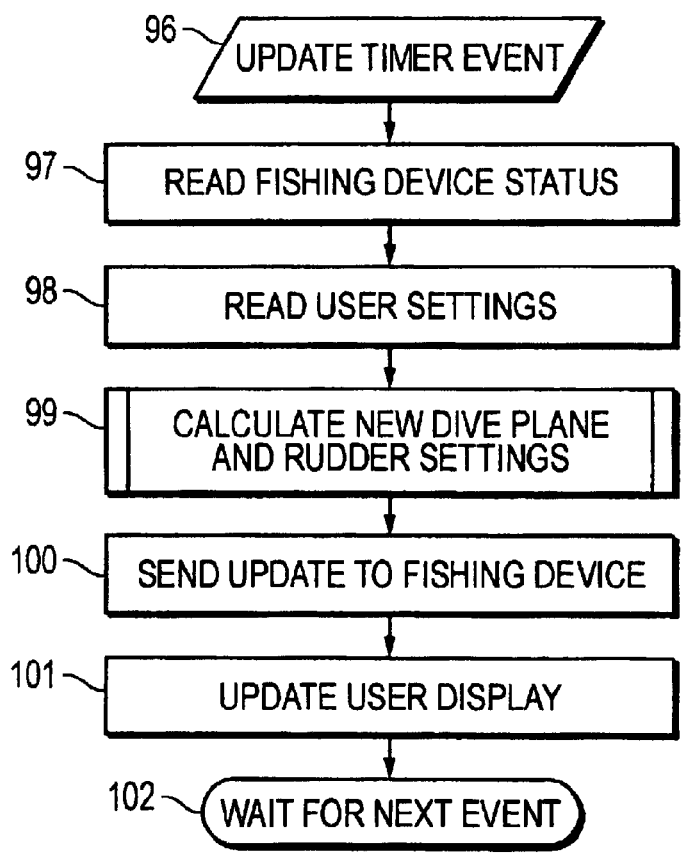
FIG. 10 is a flow chart illustrating the steps of an exemplary controller mode process performed by the control box in one embodiment of the present invention.

FIG. 10 is a flow chart illustrating the steps of an exemplary controller mode process performed by the control box in one embodiment of the present invention. The system update timer 47 generates an event which is detected at step 96. At step 97, the control box 31 then uses the communications link 36 to read the status of the fishing device 10. Once again, the status information may include raw pressure measurements and optional temperature measurements taken by the device's pressure sensors 21 and 22 and the temperature sensor 35. At step 98, the control box reads any settings that have been set by the user. At step 99, the device's depth and azimuth readings are compared to the current user settings, and new settings for the dive plane and rudder are calculated. At step 100, the new settings for the dive plane and rudder are sent over the communications link to the fishing device. At step 101, the user display is updated with the new device settings and the current status. The process then moves to step 102, releases the processor 43, and waits for the next triggering event.

It is thus believed that the operation and construction of the present invention will be apparent from the foregoing description. While the apparatus and system shown and described has been characterized as being preferred, it will be readily apparent that various changes and modifications could be made therein without departing from the scope of the invention as defined in the following claims.

What is claimed is:

1. A system for electronically controlling a fishing device in a body of water, said system comprising:

a fishing device that includes means responsive to control instructions for controlling the device's depth and azimuth heading, the means for controlling the device's depth and azimuth having:
  a plurality of control surfaces extending from the device into a surrounding body of water; and
  electro-mechanical control means for deflecting the control surfaces;

a remote controller that generates the control instructions;

a processor interfaced with the remote controller;

an external device interfaced with the processor that provides targeting information to the processor, said targeting information including location information of a fish;

said processor autonomously determining appropriate control instructions in response to the targeting information and providing the appropriate control instructions to the controller to generate the control instructions; and a communications link between the fishing device and the remote controller that carries the control instructions from the remote controller to the fishing device, whereby the control instructions command deflection of the plurality of the control surfaces to control the device's depth and azimuth heading as the fishing device travels through the body of water.

2. The system of claim 1 wherein the external device is a sonar fish finder, and the targeting information is fish location information.

3. The system of claim 2 wherein the fishing device includes means for reporting its location to the processor, and the processor uses the reported location of the fishing device and the fish location information to provide appropriate control instructions for the controller to steer the fishing device to the fish.

4. The system of claim 1 wherein the fishing device is connected to the remote controller with a tether, and the communications link between the fishing device and the remote controller is selected from a group consisting of:

a sonic data link that utilizes sound waves in the water to transmit the control instructions to the fishing device;

an electromagnetic data link that utilizes electromagnetic waves through the water to transmit the control instructions to the fishing device; and a wireline data link that utilizes a data connection through the tether to transmit the control instructions to the fishing device.

* * * * *